United States Patent
Schieman et al.

[15] 3,683,264
[45] Aug. 8, 1972

[54] ADAPTIVE LIMIT CURRENT

[72] Inventors: Robert G. Schieman, Cleveland Heights; Lee J. Penkowski, Concord Township, both of Ohio

[73] Assignee: Reliance Electric Company

[22] Filed: Nov. 12, 1970

[21] Appl. No.: 88,826

[52] U.S. Cl. .......................... 321/14, 317/31, 321/5, 321/19, 321/45 C
[51] Int. Cl. .............................................. H02m 1/18
[58] Field of Search .......... 321/5, 14, 19, 45 R, 45 C; 318/227; 323/9; 317/27, 31

[56] References Cited

UNITED STATES PATENTS

| | | | |
|---|---|---|---|
| 3,628,126 | 12/1971 | Kawakami et al. | 321/45 C |
| 3,384,803 | 5/1968 | Hardin et al. | 321/2 |
| 3,531,711 | 9/1970 | Fusco | 321/14 |
| 3,609,507 | 9/1971 | Beck | 321/14 |
| 3,611,111 | 10/1970 | Johnston | 321/45 C |
| 3,437,905 | 4/1969 | Healey et al. | 321/19 |
| 3,355,653 | 11/1967 | Paradissis | 321/19 X |
| 3,569,819 | 3/1971 | Martzloff et al. | 321/45 R |
| 3,394,299 | 7/1968 | Lawn et al. | 321/14 X |

FOREIGN PATENTS OR APPLICATIONS

| | | | |
|---|---|---|---|
| 1,063,733 | 3/1967 | Great Britain | 321/45 C |

Primary Examiner—William H. Beha, Jr.
Attorney—Woodling, Krost, Granger and Rust

[57] ABSTRACT

A limit circuit responsive to varying input line voltages to an inverter in order to establish a variable current limit value or maximum current at which the inverter circuit is allowed to operate. If the load current attempts to exceed a variable value established by the input line voltage, the current is limited, and in the preferred embodiment the current is electronically interrupted.

8 Claims, 2 Drawing Figures

INVENTORS.
ROBERT G. SCHIEMAN
LEE J. PENKOWSKI
BY Woodling, Krost,
Granger and Rust
ATTORNEYS.

ADAPTIVE LIMIT CURRENT

BACKGROUND OF THE INVENTION

Many electrical circuits have been devised utilizing some form of current limit to limit the maximum current carrying capacity of that particular circuit. In some cases a fuse or circuit breaker is actuated to completely interrupt the circuit on attempted overload currents. In many energy conversion devices which convert energy between DC and AC, there are switching devices which are periodically switched on and off and these establish either the frequency of the output voltage or establish the RMS value of the output voltage. Increasingly in recent years, semi-conductor switches have been used to replace the previously used thyratrons or mercury-arc rectifiers. The on and off periods of the switching devices may be referred to as commutation of the devices and in many energy conversion units such as inverters, there are capacitors, the charge on which establishes the commutation capability. The commutation circuit is usually such that the capacitor is charged in one polarity then by closing an auxiliary thyristor the charge on the capacitor is conducted through a main thyristor to turn it off. After this main thyristor is turned off, current usually continues to flow through the capacitor to charge it in the opposite polarity. The voltage available to charge the capacitors in the commutation circuit, is a function of the DC input voltage or line voltage or some other nominally fixed but usually variable voltage within the inverter. This line voltage is stated to be nominally fixed but in actual practice this line voltage varies by perhaps plus or minus 10 percent from this nominal value. This is because sudden loads on the line will instantaneously lower the line voltage, or if such additional loads are suddenly removed, this will instantaneously raise the line voltage. These fluctuations in line voltages are usually compensated for in line voltage sensitive circuits, but in inverter circuits of the prior art, it has been customary to assume that the line voltage is a fixed value. The thyristors used in the inverter have a certain limiting maximum current, usually dependent upon the commutation rate, because if too much heat is developed in the thyristors, they will be destroyed or at least will tend to malfunction.

Accordingly, many prior art energy conversion devices limited the current of the unit to some maximum value presumed to be safe based upon the rated current carrying capacity of the thyristors for a nominal fixed line voltage. Nevertheless it has been found that occasional failure in the thyristors has occurred for unknown reasons.

Accordingly, an object of the invention is to provide an adaptive limit circuit which obviates the above-mentioned disadvantages.

Another object of the invention is to provide an adaptive limit circuit which will vary the maximum current carrying capacity of the energy conversion unit in accordance with the voltage within the unit.

Another object of the invention is to provide an adaptive limit circuit for an inverter wherein the maximum current is allowed to increase in accordance with increase of line voltage and conversely decreases with decreasing line voltage.

Another object of the invention is to provide a comparator in an inverter comparing a signal dependent on the output current with a signal dependent on the input line voltage to control the limiting of the inverter output current.

Another object of the invention is to vary the maximum current allowed in an inverter in accordance with the voltage establishing the commutating ability or the turn-off time in a force commutated circuit.

SUMMARY OF THE INVENTION

The invention may be incorporated in an adaptive limit circuit for an energy conversion unit operable from power input terminals and supplying current to load terminals, comprising, in combination, first sensing means establishing a first signal proportional to the magnitude of the voltage across one of said sets of terminals, second sensing means establishing a second signal proportional to the magnitude of the current in said circuit, and control means responsive to said first and second signals and connected to limit the current output of said unit.

Other objects and a fuller understanding of the invention may be had by referring to the following description and claims, taken in conjunction with the accompanying drawing.

DESCRIPTION OF THE PREFERRED EMBODIMENT

Figure 1:
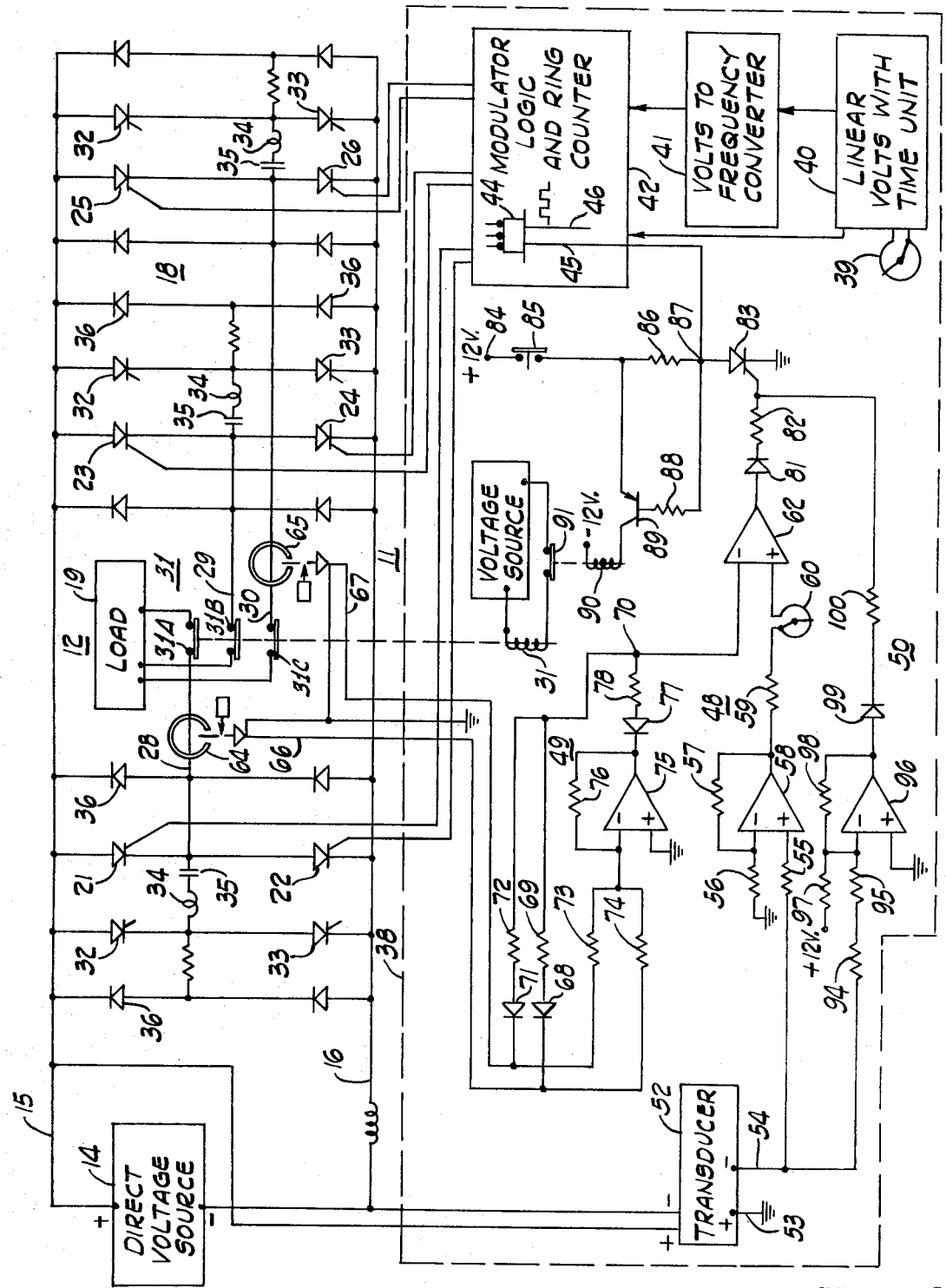
FIG. 1 is a schematic diagram of the preferred embodiment.

FIG. 1 of the drawing shows a preferred embodiment of the adaptive limit circuit 11 used with an inverter circuit 12 as one illustration of an energy conversion unit. The inverter 12 operates from a direct voltage source 14 having a positive and negative bus 15 and 16, respectively. The inverter 12 includes a power bridge 18 supplying alternating current to a load 19. In this inverter shown in FIG. 1, the load 19 is shown as a three-phase load and accordingly the power bridge 18 is a three-phase bridge. This three-phase bridge includes three pairs of switching devices, one pair for each phase and two switches in each pair connected in series between the positive and negative buses 15 and 16. These switches may be of various types and in this preferred embodiment are illustrated as thyristors 21–26, respectively. Thyristors 21 and 22 may be considered as supplying the A phase to the load, thyristors 23 and 24 the B phase, and thyristors 25 and 26 the C phase to the load 19. The interconnection between the serially connected pairs of thyristors is the output lead for each phase 28, 29 and 30, respectively. The output leads are connected to the load 19 through separate contacts 31A, 31B and 31C of a circuit breaker 31, which may be a motor starter if the load 19 is a motor, for example. Auxiliary thyristors 32 and 33 for commutation are connected in series between the positive and negative buses 15 and 16. A commutating inductance 34 and a commutating capacitor 35 are connected in series between the phase output lead 28 and the interconnection of the auxiliary thyristors 32 and 33. Protective diodes 36 may be connected effectively in inverse parallel across each of the thyristors. A control circuit 38 is provided to establish the sequential conduction of the thyristors 21–26 in order to supply three-phase power to the load 19.

The control circuit 38 controls the inverter 12 including controlling the conduction of the thyristors 21–26. If the load 19 is a motor, for example, it is usually desirable to be able to control the speed thereof. A speed control potentiometer 39 supplies a variable voltage to a linear volts with time unit 40. This has an output to a volts-to-frequency converter 41 so that with increasing voltage from the potentiometer 39, there is an increasing frequency output supplied to a modulator logic and ring counter 42. The increasing frequency will of course establish an increasing speed of the motor load 19. The modulator logic and ring counter 42 has outputs to the gate leads of the thyristors 21–26 to establish a normal sequential firing of these thyristors, and this may include any number of well-known inverter control circuits. In this modulator logic and ring counter 42, there is a Nand gate 44 with three outputs connected to control the firing of the phase A, phase B and phase C pairs of thyristors, respectively. This Nand gate 44 has two inputs 45 and 46. On the Nand gate input 46 there appears a pulsed input between logic level zero and logic level one, at a frequency dependent on the signal from the volts-to-frequency converter 41. As is well-known an And gate and a Nand gate have a truth table as follows:

| 45 IN | 46 IN | OUT AND | NAND |
|---|---|---|---|
| 0 | 0 | 0 | 1 |
| 0 | 1 | 0 | 1 |
| 1 | 0 | 0 | 1 |
| 1 | 1 | 1 | 0 |

Thus so long as the input 45 is at logic level one, then the alternate zero and one logic levels on input 46 will, together with the ring counter, establish sequential firing signals on the phase A, phase B and phase C outputs of this Nand gate 44.

The control circuit 38 includes a voltage reference circuit 48, a current limit circuit 49, and a voltage limit circuit 50. The voltage reference circuit 48 includes a transducer 52 which has an input connected to the positive and negative DC buses 15 and 16 of the inverter power bridge 18. This transducer 52 reduces this voltage to a low level suitable for use with solid state devices. In one practical circuit constructed in accordance with this invention the DC bus was 300 volts DC and the transducer 52 reduced this to a four-volt DC level on output terminals 53 and 54. The positive output terminal 53 is grounded and the negative output terminal 54 is passed through a resistor 55 to the non-inverting input of an operational amplifier 58. The inverting input of this op-amp 58 is connected through a resistor 56 to ground and a feedback resistor 57 connects the output to the input of this op-amp 58. All three resistors 55–57 are of the same value which adjusts the gain to be two. In this one practical circuit made in accordance with this invention, this means that there was nominally an 8-volt negative signal on the output of this op-amp 58. This signal is passed through a resistor 59 and a potentiometer 60 to the non-inverting input of a comparator operational amplifier 62. The potentiometer 60 may be used to set the value of the current limit.

The voltage reference circuit 48 includes means to sense the value or magnitude of a voltage in the inverter circuit 12. In this preferred embodiment the voltage sensed is that across the DC buses 15 and 16, which is proportional to the voltage across the commutating capacitors 35. Thus as the voltage on the DC buses increases, the commutating ability of the capacitors 35 will also increase and accordingly the voltage reference circuit 48 varies directly as this change in commutating ability of the capacitors 35. Accordingly, the transducer 52 is a first sensing means establishing a first signal proportional to the magnitude of the voltage across either the input or the output voltage terminals, and in this preferred embodiment across the input terminals 15 and 16.

The current limit circuit 49 is responsive to the magnitude of the current in the inverter circuit 12, and in this preferred embodiment is responsive to the load current. Second sensing means is provided to establish a second signal proportional to the magnitude of this output current and in FIG. 1 this second sensing means is shown as Hall effect devices 64 and 65 connected on two of the three output phases. FIG. 1 shows these connected on phase A and phase C outputs. Each Hall effect device 64 and 65 has two output leads with one each of the output leads grounded and the remaining leads 66 and 67 applying a signal to the current limit circuit 49. The output lead 66 is connected to pass negative voltage pulses through a reversely connected diode 68 and a resistor 69 to a summing terminal 70. Lead 67, in a similar manner, passes negative voltage pulses through a diode 71 and a resistor 72 to this summing terminal 70. A signal from the third phase is artificially created, in order to save the cost of another Hall effect device. This artificial creation of the third phase is based upon the fact that at any given instant the algebraic summation of the three phase currents is zero. Accordingly signals from the leads 66 and 67 are passed through resistors 73 and 74 and then summed or connected together and passed into the inverting input of an operational amplifier 75. A feedback resistor 76 has the same ohmic value as resistors 73 and 74. Resistors 73 and 74 sum the signals proportional to the currents of phases A and C and then this signal is inverted by op-amp 75, hence the output from op-amp 75 is equal to the phase B current.

The negative voltage pulses of this phase B current signal are then passed by a diode 77 and resistor 78 to the summing terminal 70. This is a summation of all three current signals and is proportional to the current to the load 19. This current signal is then supplied to the inverting input of the operational amplifier 62. Since it is a negative signal and it is inverted, it appears as a positive signal at the output of this op-amp 62. When the load current to the load 19 becomes sufficiently high to exceed the reference value set by the potentiometer 60, then it will exceed the input voltage from the voltage reference circuit 48 and hence the output of op-amp 62 will change from its normal negative output to a positive output. Previously this negative output was not passed by a diode 81, but now the positive output is passed upon excess current attempted to be drawn by the load 19. This signal is passed through diode 81 and a resistor 82 to the gate of a thyristor 83. This triggers the thyristor into conduction which conducts current from a positive source terminal 84 through a reset button 85 and a current limiting resistor 86 to ground. The anode of the thyristor 83 at terminal 87 is thus tied essentially to ground potential which is logic zero, and the input 45 on the Nand gate 44 is also connected to this terminal 87. This zero input on the Nand gate 44 drives all the outputs to a logic one condition, which through the modulator logic, turns on all three thyristors 21, 23 and 25, tying the load 19 through these switches to the positive bus 15 and hence limiting or terminating the voltage supply to this load 19. This is an electronic limit or electronic trip of the current and takes place in a few microseconds. This is much more rapidly than a fuse can act and hence, upon attempted over-current, this instantaneous electronic trip is actuated to limit or interrupt the current to the load 19.

Terminal 87 is also connected through a resistor 88 to the base of a transistor 89. The emitter on this transistor is connected through the reset switch 85 to the source terminal 84 and hence when terminal 87 goes to logic zero condition by the turn on of the thyristor 83, this also turns on transistor 89 to energize a relay coil 90. Contacts 91 thereof are thus opened to de-energize the coil of the circuit breaker 31 thus opening all the contacts 31A, 31B and 31C through which the load 19 is energized. This may be a motor starter if the load 19 is a motor, and thus this opening of this circuit breaker 31 occurs in perhaps 40 milliseconds after the over-current condition. This keeps the modulator logic 42 from having to be the sole means to interrupt the current to the load 19.

The voltage limit circuit 50 is also operated from the transducer 52. The negative output lead 54 passes this negative voltage signal through resistors 94 and 95 to the inverting input terminal of an operational amplifier 96. A signal from a positive voltage source such as +12 volts is also supplied through a resistor 97 to this same inverting input terminal. A feedback resistor 98 connects the output to the input of this op-amp 96. Normally the +12 volts bias on this inverting input is controlling and since the signal is inverted in op-amp 96, this appears as a negative output voltage which is not passed by a diode 99 and resistor 100 to the gate of the thyristor 83. Accordingly this thyristor 83 is not turned on under normal operation. However, if the voltage on the DC buses 15 and 16 should rise to a dangerously high level, then the signal on the negative transducer output terminal 54 would increase to a point whereat this signal overcomes the bias from the +12 volts source. Accordingly, this negative input signal would be inverted and appear a positive signal on the output of the op-amp 96, and would be passed by diode 99 to trigger the thyristor 83 to a conducting condition. As described above this would establish the electronic trip with Nand gate 44 having all logic one outputs so that the load is tied through thyristors 21, 23 and 25 to the positive bus 15. This happens within a few microseconds and about 40 milliseconds later the circuit breaker 31 will be de-energized to completely de-energize the load 19.

Thus it will be seen that the control circuit 38 is a means responsive to first and second signals and is connected to limit the current output of the inverter circuit 12. The voltage reference circuit 48 is a first sensing means which establishes a first signal proportional to the magnitude of the voltage across the input terminals 15 and 16. The current limit circuit 49 is a second sensing means establishing a second signal proportional to the magnitude of the load current. The op-amp 62 is a comparator which compares or algebraically sums the two input signals and hence compares the magnitudes of the first and second signals. When the magnitude of the second signal exceeds the magnitude of the first signal, then op-amp 62 has an output turning on thyristor 83 and transistor 89 and thus de-energizing the load 19. Thus two different ways are shown to limit the current output to the load 19.

The voltage limit circuit 50 is especially useful where the load 19 is an overhauling load such as a motor capable of being driven by its mechanical load as in an elevator or hoist. In such case the motor 19 would attempt to pump electrical power back into the DC buses 15–16 and this would suddenly attempt to raise the voltage on these buses. The direct voltage source 14 may often be a rectifier and filter including electrolytic capacitors and this suddenly raised voltage could tend to blow out the electrolytic capacitors. Thus the voltage limit circuit 50 is a means to protect the entire circuit against these sudden over-voltages on the DC input.

The adaptive limit circuit of the present invention permits the inverter circuit 12 to be utilized to its fullest extent. In one practical circuit with which this invention has been used, the voltage on the DC buses 15–16 was 300 volts DC and rated output current was 100 amperes. The input line voltage may fluctuate for any one of many reasons and may fluctuate + or −10 percent or even + or −20 percent, due to sudden applications and removals of adjacent loads. If the line voltage is suddenly reduced 10 percent then this nominal 300 volt bus is reduced to 270 volts. This also means that the voltage available for charging the commutating capacitors 35 is reduced by 10 percent. Since it is the voltage charge on the capacitors which determines the maximum safe current through the thyristors 21–26 which may be commutated off, then this load current should also be reduced by a factor of 10 percent. It is believed that this is the reason why several prior art inverter circuits mysteriously failed or malfunctioned even though supposedly the safe current limits through the thyristors were not exceeded. The present adaptive limit circuit senses this 10 percent e.g. reduction of bus voltage and establishes a 10 percent lower input signal on the non-inverting input to the comparator op-amp 62. Accordingly, should the load current exceed a value of 90 percent of the nominal rated load current, then there would be an output from the comparator op-amp 62 and this would limit the current by turning off the power to the load 19. Conversely, if the voltage on the bus 15–16 were to increase to 110 percent of the nominal value, this would be 330 volts in the above example. Under such conditions the current to the load 19 would be allowed to increase to 110 percent of the nominal or rated current, because now the capacitors 35 would have a 10 percent higher voltage so that they would be able to commutate off a 10 percent greater current through the thyristors 21–26. At the same time the voltage limit circuit 50 prevents this being carried to an extreme which would damage the load 19, the inverter 12 or the electrolytic capacitors in the filter of the direct voltage source 14.

Figure 2:
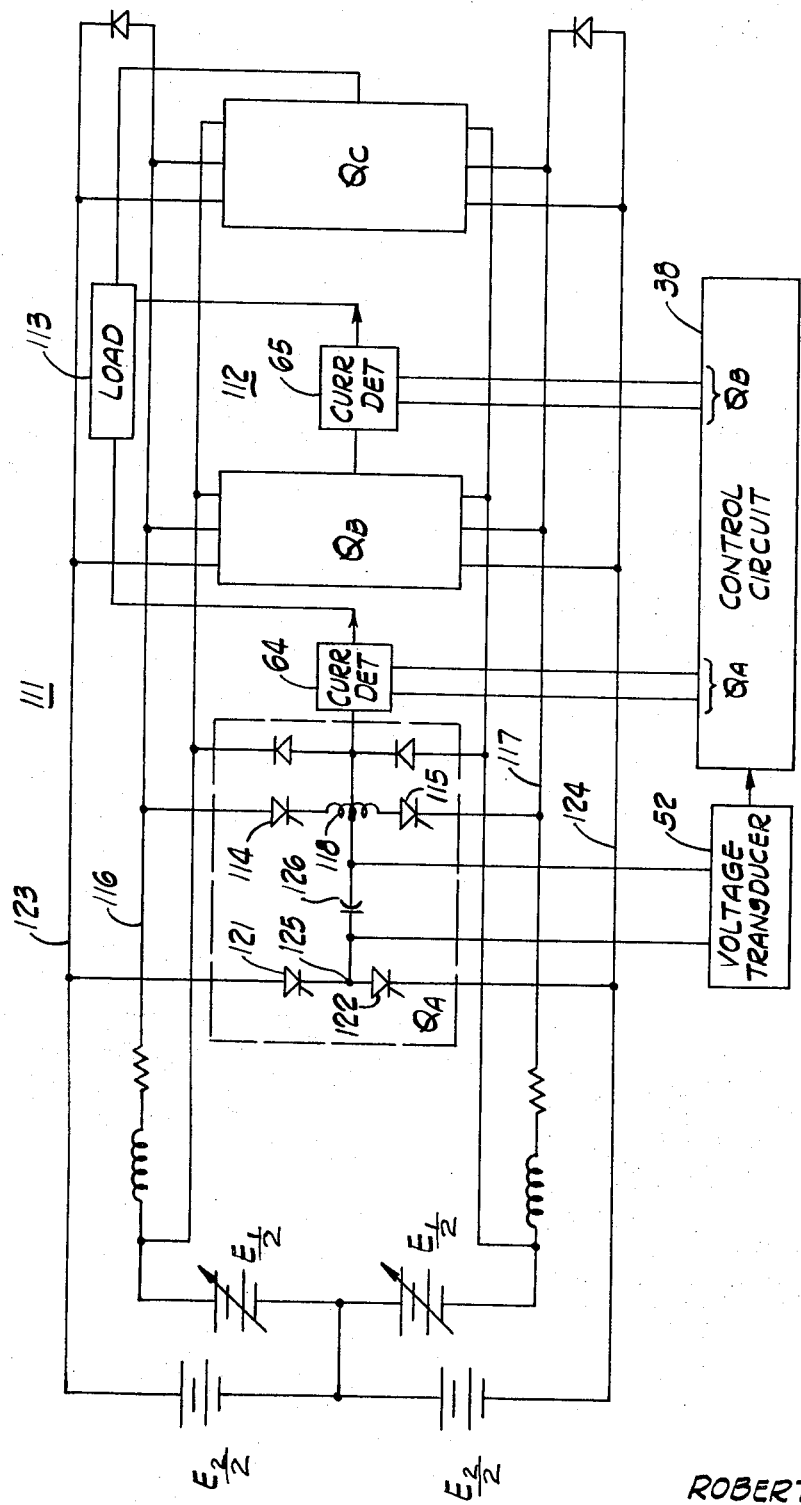
FIG. 2 is a schematic diagram of an alternative form of inverter embodying the invention.

FIG. 2 is a modification of the invention used with an inverter 111. This inverter is not of the pulse width modulated type, rather it is one having a variable voltage input, or a VVI type. The inverter 111 includes a power bridge 112 supplying power to a three phase load 113. All three phases of the power bridge 112 may be identical so only the first phase is shown in detail. It includes thyristors 114 and 115 connected in series across variable voltage buses 116 and 117. The voltage across these buses 116 and 117 is varied, by means not shown, in order to supply a variable voltage and hence variable current to the load 113. The two thyristors 114 and 115 are connected in series by an inductance 118, the center tap of which is connected to the phase output terminal to the load. Auxiliary commutating thyristors 121 and 122 are connected in series between fixed DC buses 123 and 124. The auxiliary commutating thyristors 121 and 122 are interconnected at a terminal 125 and a commutating capacitor 126 is connected between this terminal 125 and the center tap of inductance 118. The reason for supplying the auxiliary thyristors 121 and 122 from the fixed buses 123 and 124 is to make sure that there will always be sufficient commutation voltage to charge the capacitor 126. If the auxiliary thyristors 121 and 122 were fed from the variable voltage buses 116 and 117, then with low voltage outputs of the inverter 111, there easily could be insufficient voltage available to charge the capacitor 126. This means that it would not commutate full load current.

Current detectors 64 and 65 are again provided to sense the value of the output current to the load 113. The voltage transducer 52, is, in this circuit, connected directly across the commutating capacitor 126. This is a more direct way to obtain the actual voltage on this commutating capacitor, and is an alternative to the circuit arrangement of FIG. 1. In this VVI inverter it is a circuit modification which assures that the actual voltage on the capacitor in FIG. 2 is being sensed, it is proportional to the input voltage on the fixed voltage buses 123 and 124, and is equal to $E_{1/2} + E_{2/2}$. A control circuit 38, which may be the same as in FIG. 1, is connected to receive the first signal from the voltage transducer 52 and the second signal from the current detectors 64 and 65. These signals are compared and control the current to the load 113, as in FIG. 1.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. An adaptive limit circuit for an inverter changing DC into AC operable from a fluctuating power source having power input terminals and supplying current to load terminals, comprising in combination,
   first sensing means establishing a first signal proportional to the magnitude of the voltage across the power input terminals,
   second sensing means establishing a second signal proportional to the magnitude of the current to the load terminals,
   capacitor means connected to the inverter to commutate the current to the load terminals,
   said capacitor means having an increased commutation ability with increased voltage at the power input terminals,
   and control means including a comparator comparing said first and second signals to limit the current to the load terminals in response to the magnitude of said second signal exceeding the magnitude of said first signal to increase the limit value of the current to the load terminals in direct proportion to an increase of the voltage at the power input terminals and to decrease the limit value of the current to the load terminals in direct proportion to a decrease of the voltage at the power input terminals.

2. An adaptive limit circuit as set forth in claim 1, including semiconductor switch means connected between the power and load terminals to carry current to the load terminals,
   and said capacitor means connected to said switch means to commutate the current therebetween.

3. A limit circuit as set forth in claim 1, wherein said first and second signals are first and second voltages proportional to the magnitude of the input voltage and the magnitude of the output current respectively.

4. A limit circuit as set forth in claim 1, including means responsive to the comparator output to interrupt the current output of the inverter.

5. A limit circuit as set forth in claim 1, wherein said control means includes means to algebraically sum said first and second signals.

6. A limit circuit as set forth in claim 1, including,
   plural semi-conductor devices acting as switch means,
   a first group of said semi-conductor devices connected to a positive input terminal,
   a second group of said semi-conductor devices connected to a negative input terminal,
   and said control means operative to establish conduction of all semiconductor devices in one of said groups upon said second signal exceeding said first signal.

7. A limit circuit as set forth in claim 1, wherein said control means limits the current output upon said first signal exceeding a limit value.

8. A limit circuit as set forth in claim 1, including a voltage limit circuit in said control means, and said voltage limit circuit connected to limit the current output of the inverter upon the input voltage exceeding a limit value.

* * * * *